United States Patent
Watanabe et al.

(10) Patent No.: US 11,577,470 B2
(45) Date of Patent: Feb. 14, 2023

(54) THREE-DIMENSIONAL SHAPING APPARATUS

(71) Applicant: Seiko Epson Corporation, Tokyo (JP)

(72) Inventors: Manabu Watanabe, Shiojiri (JP); Eiji Okamoto, Matsumoto (JP); Akihiko Tsunoya, Okaya (JP); Koji Fujimori, Matsumoto (JP); Kazuhide Nakamura, Asahi (JP)

(73) Assignee: SEIKO EPSON CORPORATION

( * ) Notice: Subject to any disclaimer, the term of this patent is extended or adjusted under 35 U.S.C. 154(b) by 64 days.

(21) Appl. No.: 17/104,050

(22) Filed: Nov. 25, 2020

(65) Prior Publication Data
US 2021/0154940 A1 May 27, 2021

(30) Foreign Application Priority Data
Nov. 27, 2019 (JP) .............................. JP2019-214117

(51) Int. Cl.
*B29C 67/00* (2017.01)
*B29C 64/393* (2017.01)
(Continued)

(52) U.S. Cl.
CPC .......... *B29C 64/393* (2017.08); *B29C 64/209* (2017.08); *B33Y 30/00* (2014.12); *B33Y 50/02* (2014.12)

(58) Field of Classification Search
CPC ..... B29C 64/209; B29C 64/393; B33Y 10/00; B33Y 30/00; B33Y 50/00; B33Y 50/02
See application file for complete search history.

(56) References Cited

U.S. PATENT DOCUMENTS

| 2015/0367576 A1* | 12/2015 | Page ............... G05B 15/02 425/132 |
| 2018/0311894 A1 | 11/2018 | Saito et al. |
| 2020/0346399 A1* | 11/2020 | Huttunen ............... B33Y 10/00 |

FOREIGN PATENT DOCUMENTS

| EP | 3395540 A1 | 10/2018 |
| JP | 2018-187777 A | 11/2018 |
| WO | 2014/028826 A1 | 2/2014 |

OTHER PUBLICATIONS

Zuza, Mikolas, "Everything About Nozzles With a Different Diameter", Jun. 7, 2018, XP055783235, Retrieved from the Internet: URL:https://blog.prusaprinters.org/everything-about-nozzles-with-a-different-diameter_8344/, 25 pages.

(Continued)

*Primary Examiner* — Ryan M Ochylski
(74) *Attorney, Agent, or Firm* — Harness, Dickey & Pierce, P.L.C.

(57) ABSTRACT

Provided is a three-dimensional shaping apparatus in which surface of a three-dimensional shaped object can be prevented from being roughened. The three-dimensional shaping apparatus that shapes a three-dimensional shaped object by stacking layers of a material includes: a stage; a discharge unit that has a nozzle surface in which a nozzle hole is formed; a moving unit that is configured to change a relative position between the stage and the nozzle surface; and a control unit that is configured to control the moving unit. The control unit drives the moving unit such that a relation between a gap G between the nozzle surface and the stage or the layer of the material when the material is discharged from the discharge unit and an outer diameter Dp of the nozzle surface satisfies a following relation (1).

$$Dp \leq 20 \times G + 0.20 \text{[mm]} \quad (1)$$

1 Claim, 8 Drawing Sheets

(51) Int. Cl.
    *B33Y 30/00*           (2015.01)
    *B33Y 50/02*           (2015.01)
    *B29C 64/209*         (2017.01)

(56) References Cited

OTHER PUBLICATIONS

Chinese office action for corresponding Application No. 202011328550.8 dated May 19, 2022, with English translation (12 Pages).
https:/www.bilibili.com/video/BV1s4411f7NC?spmidfrom=333.337.search-card.all.click, Aug. 18, 2019 (7 Pages of machine transcription).
https:/www.bilibili.com/video/BV1s4411f7NC?spmidfrom=333.337.search-card.all.click, Aug. 18, 2019 (28 Pages of screen shots).

\* cited by examiner

FIG. 8

| SAMPLE ID | Dh [mm] | Dp [mm] | G [mm] | W [mm] | Rz [μm] | QUALITY OF DIMENSIONAL ACCURACY |
|---|---|---|---|---|---|---|
| SAMPLE S1 | 0.20 | 0.50 | 0.050 | 0.30 | - | OK |
| SAMPLE S2 | 0.20 | 0.50 | 0.100 | 0.30 | - | OK |
| SAMPLE S3 | 0.20 | 0.50 | 0.200 | 0.30 | - | OK |
| SAMPLE S4 | 0.20 | 0.80 | 0.050 | 0.30 | 37~59 | OK |
| SAMPLE S5 | 0.20 | 0.80 | 0.100 | 0.30 | 77~84 | OK |
| SAMPLE S6 | 0.20 | 0.80 | 0.200 | 0.30 | 95~109 | OK |
| SAMPLE S7 | 0.20 | 1.20 | 0.050 | 0.30 | 24~35 | OK |
| SAMPLE S8 | 0.20 | 1.20 | 0.100 | 0.30 | 56~73 | OK |
| SAMPLE S9 | 0.20 | 1.20 | 0.200 | 0.30 | 79~93 | OK |
| SAMPLE S10 | 0.20 | 2.20 | 0.100 | 0.30 | 85~92 | OK |
| SAMPLE S11 | 0.20 | 2.20 | 0.200 | 0.30 | 83~88 | OK |
| SAMPLE S12 | 0.20 | 2.20 | 0.050 | 0.30 | - | NG |
| SAMPLE S13 | 0.20 | 2.20 | 0.070 | 0.30 | - | NG |
| SAMPLE S14 | 0.20 | 5.40 | 0.200 | 0.30 | - | NG |
| SAMPLE S15 | 0.20 | 1.00 | 0.025 | 0.30 | - | NG |

THREE-DIMENSIONAL SHAPING APPARATUS

The present application is based on, and claims priority from JP Application Serial Number 2019-214117, filed Nov. 27, 2019, the disclosure of which is hereby incorporated by reference herein in its entirety.

BACKGROUND

1. Technical Field

The present disclosure relates to a three-dimensional shaping apparatus.

2. Related Art

JP-A-2018-187777 describes a device for shaping a three-dimensional shaped object by stacking a molten material discharged from a nozzle on a shaping table.

In the above-described device, a three-dimensional shaped object having a smooth surface can be shaped by reducing a gap between the nozzle and a stage or a layer of the material when the material is discharged from the nozzle onto the stage or the layer of the material. However, the inventors of the present application have found that when the above-described gap is reduced, the nozzle interferes with the three-dimensional shaped object being shaped, and the surface of the three-dimensional shaped object may become rough.

SUMMARY

An embodiment of the present disclosure provides a three-dimensional shaping apparatus configured to shape a three-dimensional shaped object by stacking layers of a material. The three-dimensional shaping apparatus includes: a stage; a discharge unit that has a nozzle surface in which a nozzle hole is formed; a moving unit configured to change a relative position between the stage and the nozzle surface; and a control unit configured to control the moving unit. The control unit is configured to drive the moving unit such that a relation between a gap G between the nozzle surface and the stage or a layer of the material when the material is discharged from the discharge unit and an outer diameter Dp of the nozzle surface satisfies a following relation (1).

$$Dp \leq 20 \times G + 0.20 \text{ [mm]} \quad (1)$$

BRIEF DESCRIPTION OF THE DRAWINGS

FIG. 8 is a table showing test results obtained by examining quality of dimensional accuracy of three-dimensional shaped objects.

DESCRIPTION OF EXEMPLARY EMBODIMENTS

A. First Embodiment

Figure 1:
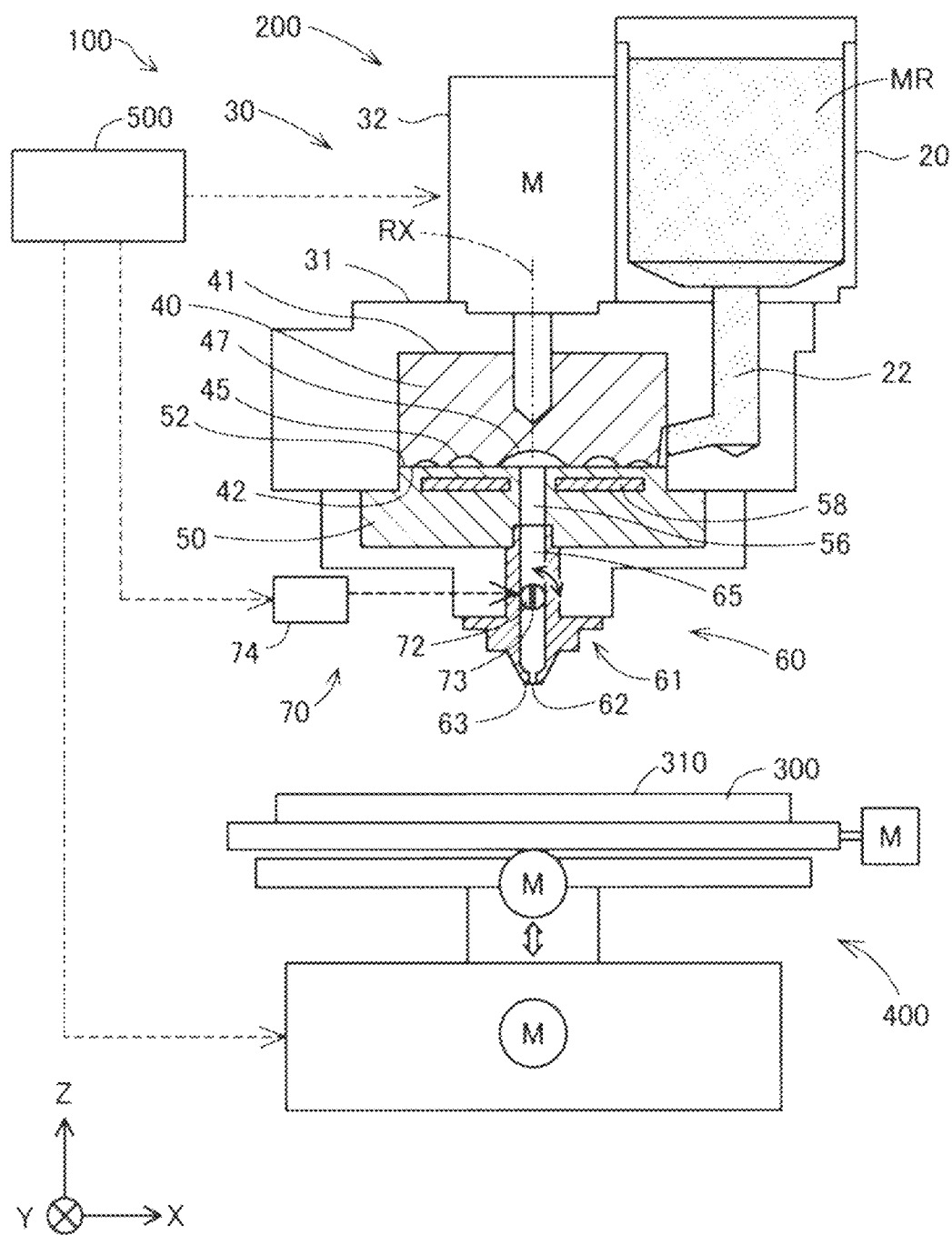
FIG. 1 is an explanatory diagram showing a schematic configuration of a three-dimensional shaping apparatus.

FIG. 1 is an explanatory diagram showing a schematic configuration of a three-dimensional shaping apparatus 100 according to a first embodiment. FIG. 1 shows arrows along X, Y and Z directions orthogonal to each other. The X direction and the Y direction are directions along horizontal directions, and the Z direction is a direction along a vertical direction. Other drawings also show arrows along the X, Y and Z directions appropriately. The X, Y and Z directions in FIG. 1 and the X, Y and Z directions in other drawings indicate the same directions, respectively.

The three-dimensional shaping apparatus 100 according to the present embodiment includes a shaping unit 200, a stage 300, a moving unit 400, and a control unit 500. The shaping unit 200 has a nozzle surface 63 provided with a nozzle hole 62. The three-dimensional shaping apparatus 100 discharges a shaping material from the nozzle hole 62 while changing a relative position between the nozzle surface 63 and the stage 300 under control of the control unit 500, thereby stacking layers of the shaping material on the stage 300 so as to shape a three-dimensional shaped object having a desired shape. The shaping material may be referred to as a molten material. A detailed configuration of the shaping unit 200 will be described later.

The stage 300 has a shaping surface 310 facing the nozzle surface 63. The three-dimensional shaped object is shaped on the shaping surface 310. In the present embodiment, the shaping surface 310 is provided parallel to horizontal directions, that is, the X and Y directions. The stage 300 is supported by the moving unit 400.

The moving unit 400 changes a relative position between the nozzle surface 63 and the shaping surface 310. In the present embodiment, the moving unit 400 changes the relative position between the nozzle surface 63 and the shaping surface 310 by moving the stage 300. The moving unit 400 according to the present embodiment is implemented by a three-axis positioner that moves the stage 300 in three axial directions, which are the X, Y and Z directions, by forces generated by three motors. Each motor is driven under the control of the control unit 500. The moving unit 400 may be configured to change the relative position between the nozzle surface 63 and the shaping surface 310 by moving the shaping unit 200 without moving the stage 300. The moving unit 400 may be configured to change the relative position between the nozzle surface 63 and the shaping surface 310 by moving both the stage 300 and the shaping unit 200.

The control unit 500 is implemented by a computer including one or more processors, a main storage device, and an input/output interface for inputting and outputting signals from and to an outside. In the present embodiment, the control unit 500 controls operations of the shaping unit 200 and the moving unit 400 by the processor executing a program or instruction read from the main storage device, thereby executing shaping processing for shaping the three-dimensional shaped object. The operations include changing a three-dimensional relative position between the shaping unit 200 and the stage 300. The control unit 500 may be implemented by a combination of a plurality of circuits instead of the computer.

The shaping unit 200 includes a material supply unit 20 which is a supply source of a material MR, a plasticizing unit 30 that plasticizes the material MR into the shaping material, and a discharge unit 60 having the above-described nozzle hole 62 and the nozzle surface 63. "Plasticizing" means applying heat to melt the thermoplastic material. The term "melt" not only means that a thermoplastic material is heated to a temperature equal to or higher than a melting point to be a liquid, but also means that, a thermoplastic material is softened by being heated to a temperature equal to or higher than a glass transition point to exhibit fluidity.

The material supply unit 20 supplies the material MR for generating the shaping material to the plasticizing unit 30. In the present embodiment, an ABS resin formed in a pellet shape is used as the material MR. The material supply unit 20 according to the present embodiment is implemented by a hopper that accommodates the material MR. A supply path 22 that couples the material supply unit 20 and the plasticizing unit 30 is provided below the material supply unit 20. The material MR accommodated in the material supply unit 20 is supplied to the plasticizing unit 30 via the supply path 22.

The plasticizing unit 30 plasticizes the material MR supplied from the material supply unit 20 into the shaping material and supplies the shaping material to the discharge unit 60. The plasticizing unit 30 includes a screw case 31, a drive motor 32, a flat screw 40, a barrel 50, and a heating unit 58. The screw case 31 is a housing that accommodates the flat screw 40. The barrel 50 is fixed to a lower end portion of the screw case 31, and the flat screw 40 is accommodated in a space surrounded by the screw case 31 and the barrel 50.

The flat screw 40 has a substantially cylindrical shape whose height in a direction along a central axis RX is smaller than a diameter thereof. The flat screw 40 is disposed in the screw case 31 in a manner that the central axis RX is parallel to the Z direction. An upper surface 41 side of the flat screw 40 is coupled to the drive motor 32, and the flat screw 40 rotates around the central axis RX in the screw case 31 due to a torque generated by the drive motor 32. The flat screw 40 has a groove forming surface 42 in which groove portions 45 are formed on a side opposite to the upper surface 41. The barrel 50 has a screw facing surface 52 that faces the groove forming surface 42 of the flat screw 40. A communication hole 56 that communicates with the discharge unit 60 is provided on the center of the screw facing surface 52.

Figure 2:
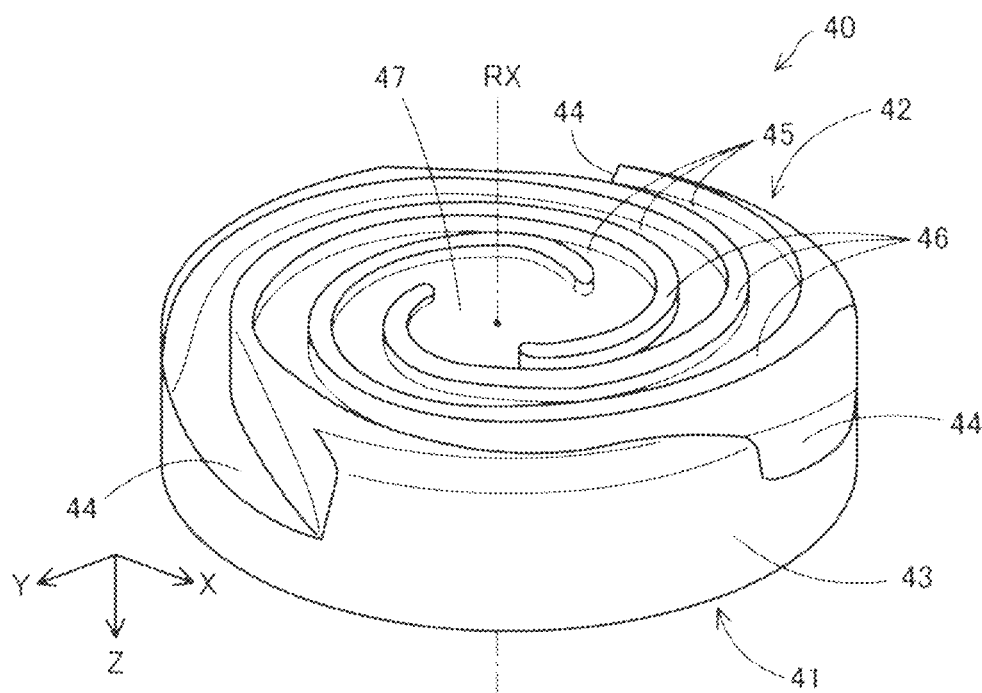
FIG. 2 is a perspective view showing a configuration of a flat screw.

FIG. 2 is a perspective view showing a configuration of the flat screw 40. In FIG. 2, in order to facilitate understanding of the technique, the flat screw 40 is shown in a manner upside-down with respect to FIG. 1. In FIG. 2, the position of the central axis RX of the flat screw 40 is indicated by a one-dot chain line. A central portion 47 of the groove forming surface 42 of the flat screw 40 is configured as a recess to which one end of each groove portion 45 is coupled. The central portion 47 faces the communication hole 56 of the barrel 50 shown in FIG. 1. The central portion 47 intersects the central axis RX. In the present embodiment, the groove portions 45 extend in a vortex shape from the central portion 47 in a manner of drawing an arc toward an outer periphery of the flat screw 40. The groove portions 45 may be configured to extend in a spiral shape. The groove forming surface 42 is provided with ridge portions 46 that constitute side wall portions of the groove portions 45 and extend along the groove portions 45. Each groove portion 45 is continuous to a material introduction port 44 formed in a side surface 43 of the flat screw 40. The material introduction port 44 is a part for receiving the material MR supplied via the supply path 22 of the material supply unit 20. The material MR introduced into the groove portion 45 from the material introduction port 44 is conveyed toward the central portion in the groove portion 45 by the rotation of the flat screw 40.

FIG. 2 shows the flat screw 40 having three groove portions 45 and three ridge portions 46. The number of the groove portions 45 and the ridge portions 46 provided in the flat screw 40 is not limited to three. The flat screw 40 may be provided with only one groove portion 45, or may be provided with two or more groove portions 45. Any number of the ridge portions 46 may be provided in accordance with the number of the groove portions 45. FIG. 2 shows the flat screw 40 in which the material introduction ports 44 are formed at three locations. The positions of the material introduction ports 44 provided in the flat screw 40 are not limited to three. In the flat screw 40, the material introduction port 44 may be provided at only one location, or may be provided at two or more locations.

Figure 3:
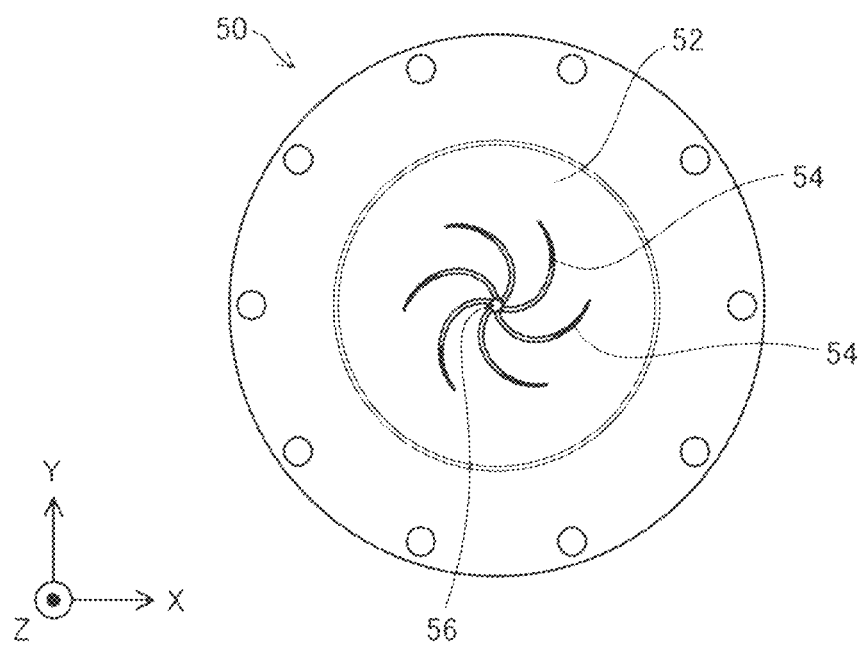
FIG. 3 is a top view showing a configuration of a barrel.

FIG. 3 is a top view showing a configuration of the barrel 50. As described above, the communication hole 56 communicating with the discharge unit 60 is formed at a center of the screw facing surface 52. A plurality of guide grooves 54 are formed around the communication hole 56 in the screw facing surface 52. Each guide groove 54 has one end coupled to the communication hole 56, and extends in a vortex shape from the communication hole 56 toward an outer periphery of the screw facing surface 52. The guide grooves 54 have a function of guiding the shaping material to the communication hole 56. The guide grooves 54 may not be provided on the screw facing surface 52.

As shown in FIG. 1, the heating unit 58 for heating the material MR is embedded in the barrel 50. The heating unit 58 may be not embedded in the barrel 50, and may be disposed below the barrel 50, for example. In the present embodiment, the heating unit 58 is implemented by a heater that generates heat by being supplied with electric power. A temperature of the heating unit 58 is controlled by the control unit 500. The material MR conveyed in the groove portions 45 is plasticized by shear caused by the rotation of the flat screw 40 and the heat from the heating unit 58 into a paste-shaped shaping material. The shaping material is supplied from the communication hole 56 to the discharge unit 60.

The discharge unit 60 discharges the shaping material supplied from the plasticizing unit 30. The discharge unit 60 includes a nozzle 61, a flow path 65, and an opening/closing mechanism 70. The nozzle 61 is provided at a lower end portion of the discharge unit 60. The nozzle 61 has the above-described nozzle surface 63 and the nozzle hole 62. The flow path 65 communicates with the communication hole 56 of the barrel 50 and the nozzle hole 62, and the shaping material flows from the communication hole 56 toward the nozzle hole 62. The shaping material flowing through the flow path 65 is discharged from the nozzle hole 62.

Figure 4:
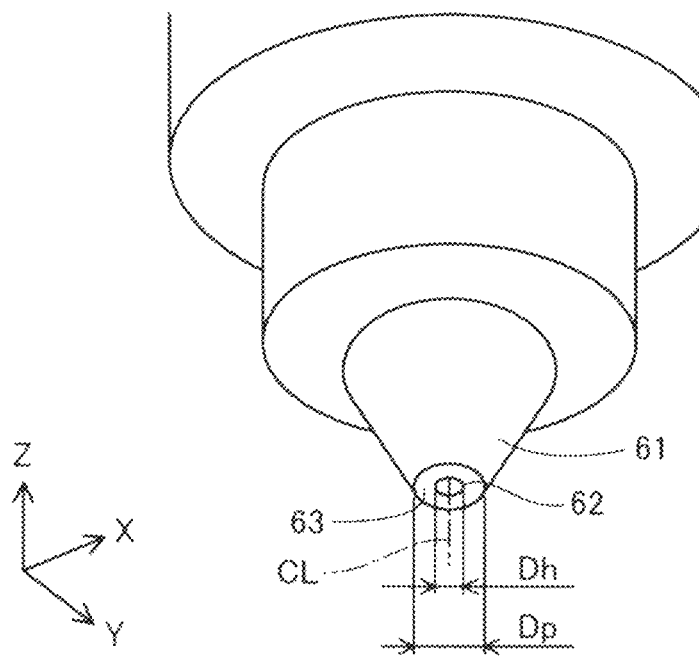
FIG. 4 is a perspective view showing a configuration of a nozzle.

FIG. 4 is a perspective view showing a configuration of the nozzle 61. In the present embodiment, the nozzle 61 has the circular nozzle surface 63 centered on a central axis CL, and the circular nozzle hole 62 centered on the central axis CL. In the present embodiment, an inner diameter Dh of the nozzle hole 62 is 0.20 mm, and an outer diameter Dp of the nozzle surface 63 is 0.50 mm.

As shown in FIG. 1, the opening/closing mechanism 70 opens and closes the flow path 65 to control the discharge of the shaping material from the nozzle hole 62. In the present embodiment, the opening/closing mechanism 70 is implemented by a butterfly valve. The opening/closing mechanism 70 includes a drive shaft 72, which is a shaft-shaped member, a valve body 73 that opens/closes the flow path 65 in accordance with a rotation of the drive shaft 72, and a valve drive unit 74 that causes the drive shaft 72 to rotate.

The drive shaft 72 is attached in the middle of the flow path 65 in a manner of intersecting a flow direction of the shaping material. In the present embodiment, the drive shaft 72 is attached in a manner parallel to the Y direction which is a direction perpendicular to the flow direction of the shaping material in the flow path 65. The drive shaft 72 is rotatable about a central axis along the Y direction.

The valve body 73 is a plate-shaped member that rotates in the flow path 65. In the present embodiment, the valve body 73 is formed by processing a portion of the drive shaft 72 that is disposed in the flow path 65 into a plate shape. A shape of the valve body 73 when viewed from a direction perpendicular to a plate surface is substantially the same as the opening shape of the flow path 65 at a portion where the valve body 73 is disposed.

The valve drive unit 74 causes the drive shaft 72 to rotate under the control of the control unit 500. The valve drive unit 74 is implemented by, for example, a stepping motor. The rotation of the drive shaft 72 causes the valve body 73 to rotate in the flow path 65.

When the valve drive unit 74 holds a plate surface of the valve body 73 in a manner perpendicular to the direction in which the shaping material flows in the flow path 65, a supply of the shaping material from the flow path 65 to the nozzle 61 is blocked, and a discharge of the shaping material from the nozzle 61 is stopped. When the valve drive unit 74 rotates the drive shaft 72 such that the plate surface of the valve body 73 holds an acute angle relative to the direction in which the shaping material flows in the flow path 65, a supply of the shaping material from the flow path 65 to the nozzle 61 is started, and the shaping material is discharged from the nozzle 61 by a discharge amount in accordance with a rotation angle of the valve body 73. As shown in FIG. 1, when the valve drive unit 74 holds the plate surface of the valve body 73 parallel to the direction in which the shaping material flows in the flow path 65, a flow path resistance of the flow path 65 is in a lowest state. In this state, the discharge amount of the shaping material per unit time from the nozzle 61 becomes maximum. In this way, the opening/closing mechanism 70 can be implemented to switch ON/OFF of the discharge of the shaping material and adjust the discharge amount of the shaping material.

Figure 5:
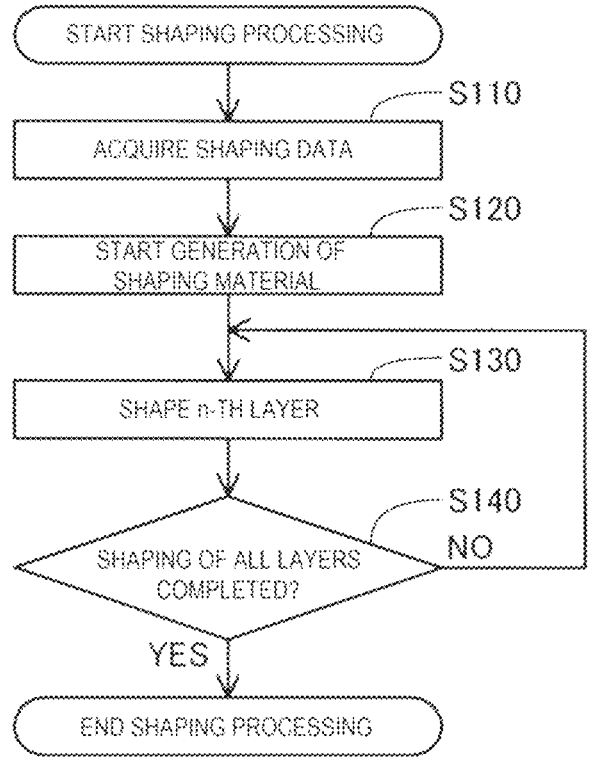
FIG. 5 is a flowchart showing content of shaping processing.

FIG. 5 is a flowchart showing content of the shaping processing according to the present embodiment. The control unit 500 executes the processing when a predetermined start operation is performed by a user on an operation panel provided in the three-dimensional shaping apparatus 100 or a computer coupled to the three-dimensional shaping apparatus 100.

First, in step S110, the control unit 500 acquires shaping data for shaping the three-dimensional shaped object. The shaping data is data that represents information on a moving route of the nozzle surface 63 relative to the shaping surface 310 of the stage 300, a target position at which the shaping material is discharged from the nozzle hole 62 to the shaping surface 310, and a discharge amount of the shaping material discharged from the nozzle hole 62. The shaping data is created by, for example, slicer software installed in a computer coupled to the three-dimensional shaping apparatus 100. The slicer software reads shape data representing a shape of the three-dimensional shaped object created by using three-dimensional CAD software or three-dimensional CG software, and divides the shape of the three-dimensional shaped object into layers each having a predetermined thickness, so as to create the shaping data for each layer. Data in an STL format, AMF format or the like is used as the shape data to be read into the slicer software. The shaping data created by slicer software is represented by a G code, an M code, or the like. The control unit 500 acquires the shaping data from a computer coupled to the three-dimensional shaping apparatus 100 or a recording medium such as a USB memory.

Next, in step S120, the control unit 500 starts generation of the shaping material. The control unit 500 controls the rotation of the flat screw 40 and the temperature of the heating unit 58, and thereby plasticizes the material MR and generates the shaping material. The shaping material continues being generated while the processing is performed.

Figure 6:
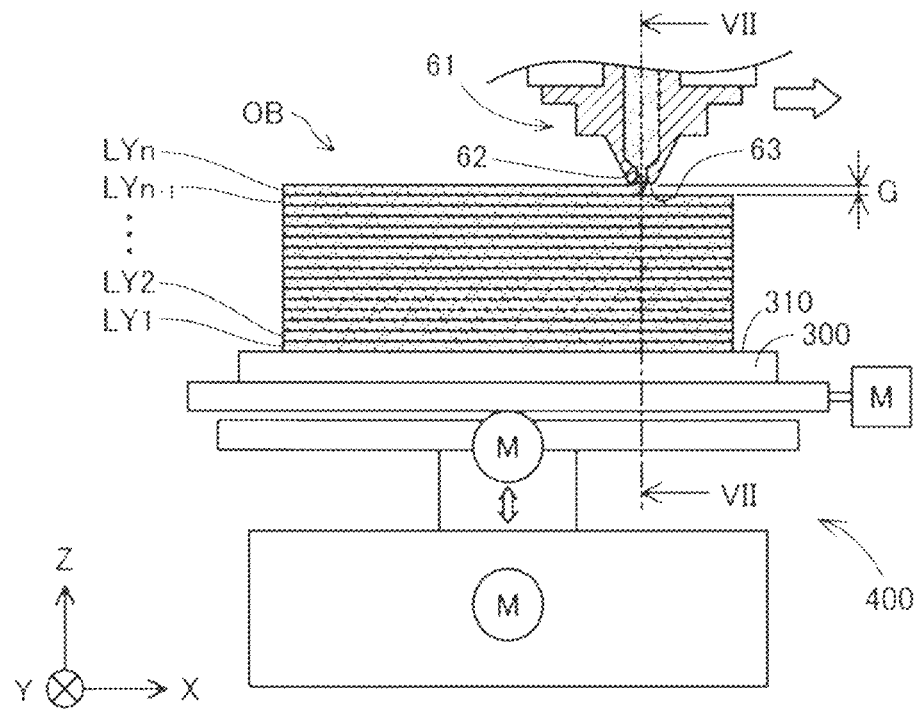
FIG. 6 is an explanatory diagram schematically shows a state in which a three-dimensional shaped object is shaped.
Figure 7:
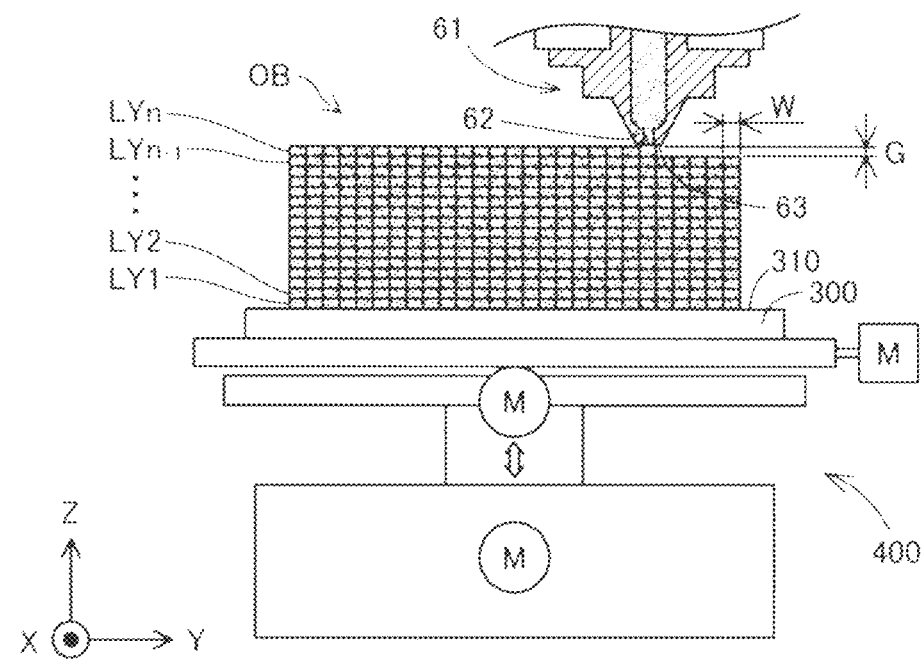
FIG. 7 is a cross-sectional view taken along a line VII-VII in FIG. 6.

FIG. 6 is an explanatory diagram schematically showing a state in which a three-dimensional shaped object OB is shaped. FIG. 7 is a cross-sectional view taken along a line VII-VII in FIG. 6. Referring to FIGS. 5 to 7, in step S130, the control unit 500 controls the moving unit 400 to change the relative position between the nozzle surface 63 and the shaping surface 310, and discharge the shaping material from the nozzle hole 62 toward the target position of the shaping surface 310, thereby shaping a first layer LY1 of the three-dimensional shaped object OB on the shaping surface 310. Thereafter, in step S140, the control unit 500 determines whether the shaping of all layers of the three-dimensional shaped object OB has been completed. The control unit 500 can determine whether the shaping of all layers of the three-dimensional shaped object OB is completed using the shaping data. In step S140, when it is not determined that the shaping of all layers of the three-dimensional shaped object OB has been completed, the control unit 500 returns the processing to step S130 to discharge the shaping material from the nozzle hole 62 toward the first layer LY1, thereby shaping a second layer LY2 on the first layer LY1. On the other hand, in step S140, when it is determined that the shaping of all layers of the three-dimensional shaped object OB has been completed, the control unit 500 ends the processing. The control unit 500 shapes the three-dimensional shaped object OB by repeating the processing of step S130 and stacking the layers of the shaping material until it is determined in step S140 that the shaping of all layers of the three-dimensional shaped object OB has been completed.

In the present embodiment, in the shaping process, the control unit 500 drives the moving unit 400 such that a relation between a gap G and the outer diameter Dp of the nozzle surface 63 satisfies a following relation (1) and a relation between the gap G and the inner diameter Dh of the nozzle hole 62 satisfies a following relation (2), and the gap G satisfies a following relation (3).

$$Dp \leq 20 \times G + 0.20 \text{ [mm]} \tag{1}$$

$$0 < G \leq Dh \tag{2}$$

$$0.05 \text{ [mm]} \leq G \leq 0.20 \text{ [mm]} \tag{3}$$

The gap G represents a gap between the shaping surface 310 or a layer of the shaping material and the nozzle surface 63 when the shaping material is discharged from the nozzle hole 62. When the first layer LY1 is shaped, the gap G represents the gap between the shaping surface 310 and the nozzle surface 63 in a direction perpendicular to the shaping surface 310. When an n-th layer LYn is formed, the gap G represents a gap between an upper surface of the (n−1)-th layer LYn−1 and the nozzle surface 63 in the direction perpendicular to the shaping surface 310. Here, n is a natural number equal to or larger than 2. For example, when the second layer LY2 is shaped, the gap G represents a gap between an upper surface of the first layer LY1 and the nozzle surface 63. In the present embodiment, the control unit 500 drives the moving unit 400 such that the gap G is kept at 0.05 mm. The information on the moving route of the nozzle surface 63 relative to the shaping surface 310 represented by the shaping data includes information on the gap G, and the control unit 500 drives the moving unit 400 in accordance with the shaping data. Information on the outer diameter Dp of the nozzle surface 63 and the inner diameter Dh of the nozzle hole 62 is input by the user when the shaping data is created. The control unit 500 controls the discharge amount such that the line width W of the shaping material is kept at 0.30 mm. In the present embodiment, as described above, the inner diameter Dh of the nozzle hole 62 is 0.20 mm, and the outer diameter Dp of the nozzle surface 63 is 0.50 mm. Therefore, the outer diameter Dp of the nozzle surface 63 satisfies a following relation (4).

$$0.50 \text{ [mm]} \leq Dp \leq 2.20 \text{ [mm]} \quad (4)$$

FIG. 8 is a table showing test results obtained by examining quality of dimensional accuracy of the three-dimensional shaped object OB. FIG. 8 shows the inner diameter Dh of the nozzle hole 62, the outer diameter Dp of the nozzle surface 63, the gap G, a line width W, a surface roughness Rz, and quality of the dimensional accuracy in an order from the left. In the test, by using the three-dimensional shaping apparatus 100, the combinations of the outer diameter Dp of the nozzle surface 63 and the gap G were varied to shape 15 kinds of the three-dimensional shaped object OB, which were samples S1 to S15, and quality of the dimensional accuracy of each of the samples S1 to S15 was examined. Each of the samples S1 to S15 was shaped to have a cube shape with a length of one side of 10 mm as a target shape. A pellet-shaped ABS resin was used as the material of each of the samples S1 to S15. With a temperature of the upper surface of the layer of the shaping material in a state of being maintained at 105° C., the shaping material was discharged onto the upper surface of the layer of the shaping material to shape each of the samples S1 to S15. The surface roughness Rz is represented by a maximum height defined in JIS B 0601: 2013. As the surface roughness Rz, a value obtained by measuring a side surface part of each sample of the cube shapes S1 to S15 by a light interference type three-dimensional measuring machine was used. As a three-dimensional measuring device, a VR-3000 manufactured by Keyence Corporation was used. As for the quality of the dimensional accuracy, when a case where an apparent shape deformation that can be visually recognized by a naked eye is not found in any of the samples S1 to S15 was regarded as having good dimensional accuracy and noted with the text "OK", and a case where an apparent shape deformation that can be visually recognized by a naked eye is found in any of the samples S1 to S15 was regarded as not having good dimensional accuracy and noted with the text "NG".

Figure 9:
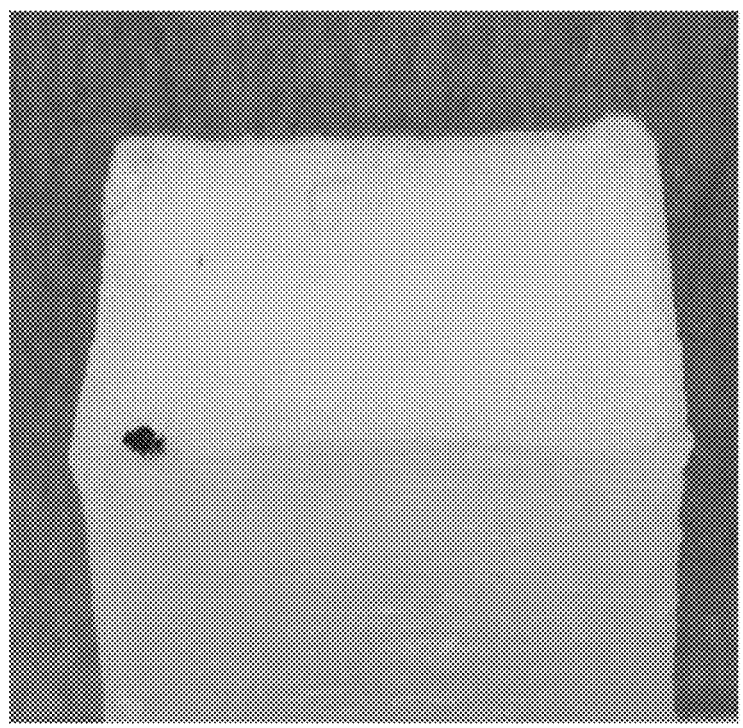
FIG. 9 is an image showing an appearance of sample S1.
Figure 10:
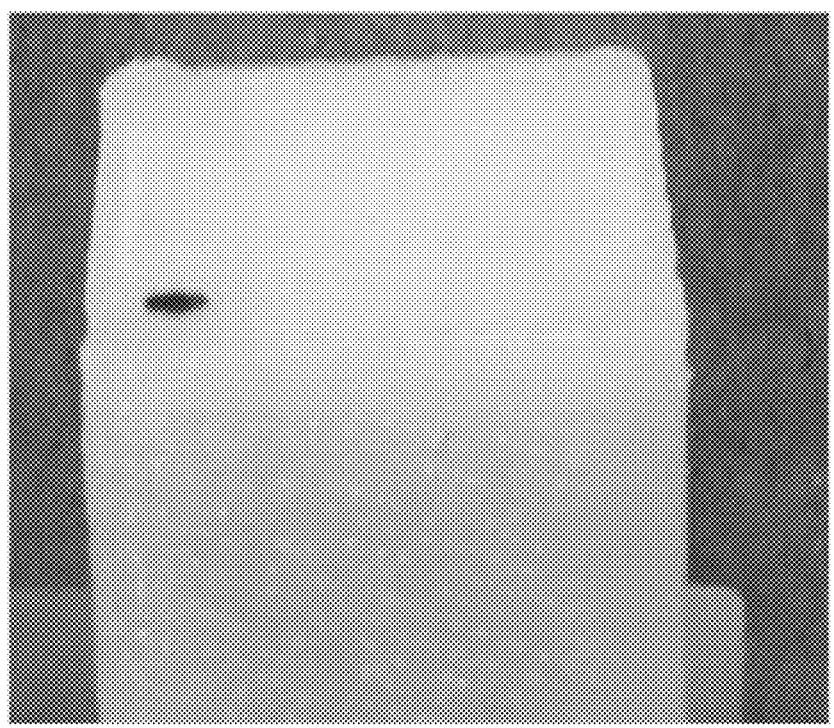
FIG. 10 is an image showing an appearance of sample S10.
Figure 11:
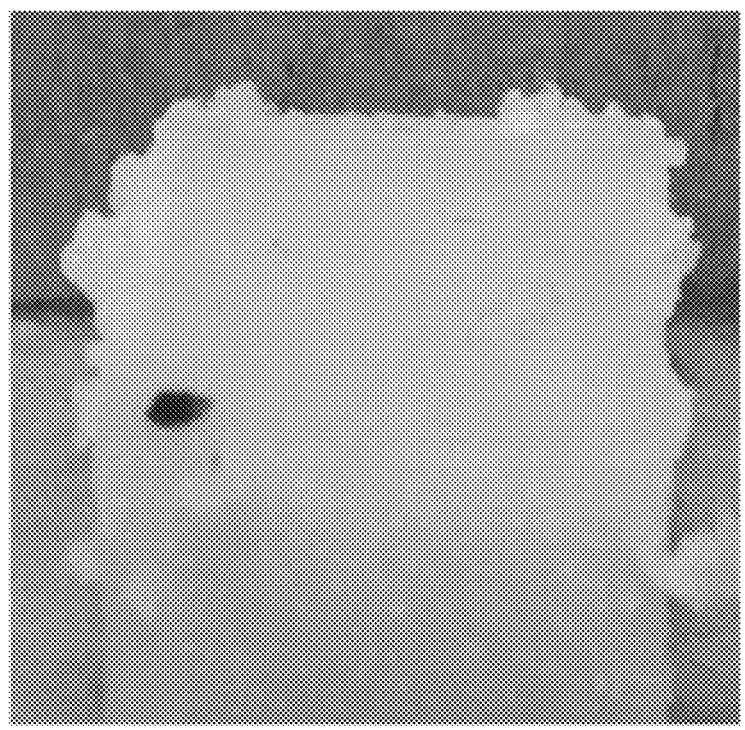
FIG. 11 is an image showing an appearance of sample S12.

FIG. 9 is an image showing an appearance of the sample S1. FIG. 10 is an image showing an appearance of the sample S10. FIG. 11 is an image showing an appearance of the sample S12. As shown in FIGS. 9 and 10, the sample S1 and the sample S10 each have a smooth surface, and the sample S1 and the sample S10 do not have an apparent shape deformation that can be visually recognized by a naked eye. As shown in FIG. 11, the sample S12 has a fluffy rough surface, and the sample S12 has an apparent shape deformation that can be visually recognized by a naked eye. Among the results of the test, the samples S1 to S11 were not found to have an apparent shape deformation that can be visually recognized by a naked eye. On the other hand, the samples S12 to S15 were found to have an apparent shape deformation that can be visually recognized by a naked eye. That is, the dimensional accuracy of the samples S1 to S11 was good, whereas the dimensional accuracy of the samples S12 to S15 was not good. The measurement of the surface roughness Rz was omitted for the samples S1 to S3. Since shape deformation of the samples S12 to S15 was significant, the surface roughness Rz was not able to be measured.

Figure 12:
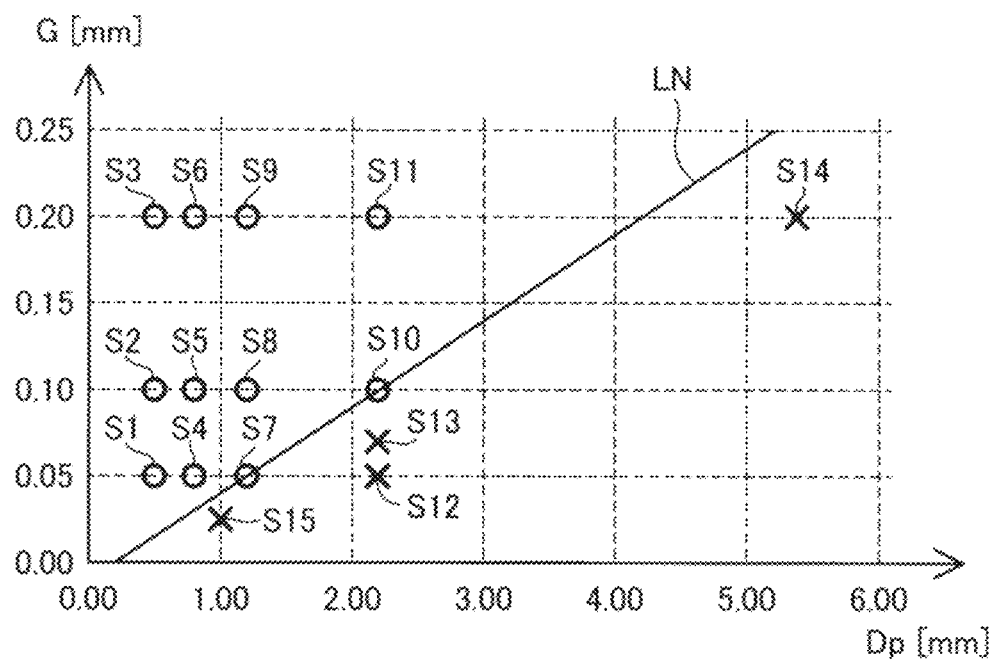
FIG. 12 is a graph showing the test results obtained by examining the quality of the dimensional accuracy of the three-dimensional shaped objects.

FIG. 12 is a graph showing the test results obtained by examining the quality of the dimensional accuracy of the three-dimensional shaped objects. A horizontal axis represents the outer diameter Dp of the nozzle surface 63. A vertical axis represents the gap G. FIG. 12 shows the relation between the outer diameter Dp of the nozzle surface 63 and the gap G when each of the samples S1 to S15 is shaped. In FIG. 12, the samples S1 to S11 which are good in dimensional accuracy are represented by "○" marks, and the samples S12 to S15 which are not good in dimension accuracy are represented by "x" marks. In FIG. 12, a region above a straight line LN and including the straight line LN is a region where the relation between the gap G and the outer diameter Dp of the nozzle surface 63 satisfies the above relation (1). When the relation between the gap G and the outer diameter Dp of the nozzle surface 63 satisfies the above relation (1), the three-dimensional shaped object OB can be shaped with high dimensional accuracy.

Figure 13:
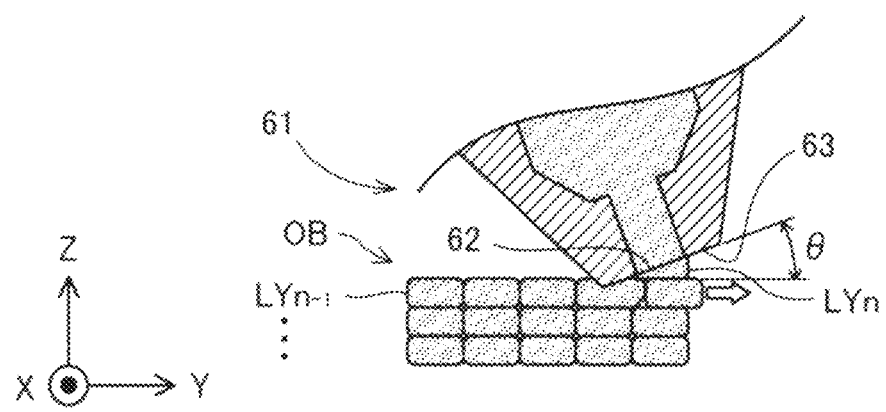
FIG. 13 is an explanatory diagram schematically showing a state in which a nozzle interferes with the three-dimensional shaped object being shaped.

FIG. 13 is an explanatory diagram schematically showing a state in which the nozzle 61 interferes with the three-dimensional shaped object OB being shaped. The nozzle 61 is provided in a manner that the nozzle surface 63 is parallel to the shaping surface 310 of the stage 300. However, an inclination el inevitably occurs between the nozzle surface 63 and the shaping surface 310 due to processing accuracy when the nozzle surface 63 is being processed and assembly accuracy when the nozzle 61 is being assembled. Therefore, if the relation between the gap G and the outer diameter Dp of the nozzle surface 63 does not satisfy the above relation (1), when the n-th layer LYn of the three-dimensional shaped object OB is shaped, there is a high possibility that the nozzle surface 63 interferes with the (n−1)-th layer LYn−1, or that the nozzle surface 63 interferes with a part of the already shaped n-th layer LYn. For example, when the nozzle surface 63 interferes with the (n−1)-th layer LYn−1, the shaping material forming the (n−1)-th layer LYn−1 may be pushed outward as indicated by an arrow in FIG. 13, and the surface of the three-dimensional shaped object OB may be rough.

According to the three-dimensional shaping apparatus 100 of the present embodiment described above, the control unit 500 drives the moving unit 400 such that the relation between the gap G and the outer diameter Dp of the nozzle surface 63 satisfies the above relation (1), and thus it is possible to prevent the nozzle surface 63 from interfering with the three-dimensional shaped object OB being shaped.

Therefore, it is possible to prevent the surface of the three-dimensional shaped object OB from being rough.

In the present embodiment, since the control unit 500 drives the moving unit 400 such that the relation between the inner diameter Dh of the nozzle hole 62 and the gap G satisfies the above relation (2), the shaping material discharged between the shaping surface 310 and the nozzle surface 63 or between the layer of the shaping material and the nozzle surface 63 can be shaped while being squeezed by the nozzle surface 63. Therefore, since the thickness of the layer of the shaping material can be reduced, a three-dimensional shaped object OB having a smooth surface can be shaped.

In the present embodiment, since the control unit 500 drives the moving unit 400 such that the gap G satisfies the above relation (3), a three-dimensional shaped object OB having a smooth surface can be shaped.

In the present embodiment, since the nozzle 61 is configured such that the outer diameter Dp of the nozzle surface 63 satisfies the above relation (4), it is possible to prevent the gap G from decreasing even when the nozzle surface 63 is inclined relative to the shaping surface 310. Therefore, a possibility that the nozzle 61 interferes with the three-dimensional shaped object OB being shaped can be reduced.

Although the pellet-shaped ABS resin is used as the material MR in the present embodiment, as the material MR used in the shaping unit 200, materials by which a three-dimensional shaped object can be shaped, in which various materials such as a thermoplastic material, a metal material, or a ceramic material serve as a main material, can be adopted. Here, the "main material" means a material serving as a center forming the shape of the three-dimensional shaped object, and means a material that occupies a content rate of equal to or more than 50 wt % in the three-dimensional shaped object. The above-described shaping materials include those in which the main material is melted as a simple substance, or those obtained by melting a part of components contained together with the main material into a paste shape.

When a thermoplastic material is used as the main material, the shaping material is generated by plasticizing the material in the plasticizing unit 30. "Plasticizing" means applying heat to melt the thermoplastic material. The term "melt" means that a thermoplastic material is softened by being heated to a temperature equal to or higher than a glass transition point to exhibit fluidity.

For example, any one or two or more of the following thermoplastic resin materials can be used as the thermoplastic material.

Examples of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polycarbonate (PC), modified polyphenylene ether, polybutylene terephthalate, and polyethylene terephthalate; and engineering plastics such as polysulfone, polyethersulfone, polyphenylene sulfide, polyarylate, polyimide, polyamideimide, polyetherimide, and polyether ether ketone (PEEK)

A pigment, a metal, a ceramic, and additives such as a wax, a flame retardant, an antioxidant, and a heat stabilizer may be mixed into the thermoplastic material. The thermoplastic material is converted to a plasticized and melted state by the rotation of the flat screw 40 and the heating of the heating unit 58 in the plasticizing unit 30. The shaping material generated in such a manner is discharged from the nozzle hole 62, and then cured due to a decrease in temperature.

It is desirable that the thermoplastic material is emitted from the nozzle hole 62 in a state in which the material is heated to a temperature equal to or higher than the glass transition point thereof and in a completely melted state. The term "completely melted state" means a state in which unmelted thermoplastic material does not exist, for example, when a pellet-like thermoplastic resin is used as a material, the "completely melted state" means a state in which a pellet-shaped solid matter does not remain.

In the shaping unit 200, for example, the following metal materials can be used as the main material instead of the above-described thermoplastic materials. In this case, it is desirable that a powder material in which the following metal material is formed into a powder form is mixed with a component to be melted when generating the shaping material, and the mixed material is supplied to the plasticizing unit 30.

Examples of Metal Material

A single metal of magnesium (Mg), iron (Fe), cobalt (Co), chromium (Cr), aluminum (Al), titanium (Ti), copper (Cu), nickel (Ni), or an alloy containing one or more of these metals Examples of the Above-Described Alloy Maraging steel, stainless steel, cobalt chrome molybdenum, titanium alloy, nickel alloy, aluminum alloy, cobalt alloy, and cobalt chromium alloy In the shaping unit 200, a ceramic material can be used as the main material instead of the above-described metal materials. For example, oxide ceramics such as silicon dioxide, titanium dioxide, aluminum oxide, and zirconium oxide, or non-oxide ceramics such as aluminum nitride can be used as the ceramic material. When the metal material or ceramic material as described above is used as the main material, the shaping material disposed on the stage 300 may be cured by, for example, sintering with laser irradiation or warm air.

The powder material of the metal material or the ceramic material to be charged into the material supply unit 20 may be a mixed material obtained by mixing a plurality of types of powder including a single metal, powder of an alloy, and powder of a ceramic material. The powder material of the metal material or the ceramic material may be coated with, for example, a thermoplastic resin as exemplified above, or a thermoplastic resin other than the above thermoplastic resin. In this case, the thermoplastic resin may be melted in the plasticizing unit 30 to exhibit fluidity thereof.

For example, the following solvents can be added to the powder material of the metal material or the ceramic material to be charged into the material supply unit 20. The solvent can be used alone or in combination of two or more selected from the following.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (for example, tetrabutylammonium acetate); and ionic liquids such as butyl carbitol acetate In addition, for example, the following binders can be added to the powder material of the metal material or the ceramic material to be charged into the material supply unit 20.

Examples of Binder

Acrylic resin, epoxy resin, silicone resin, cellulose-based resin, or other synthetic resins; and polylactic acid (PLA), polyamide (PA), polyphenylene sulfide (PPS), polyether ether ketone (PEEK), or other thermoplastic resins B. Other Embodiments (B1) In the three-dimensional shaping apparatus 100 of the first embodiment described above, the control unit 500 drives the moving unit 400 such that the relation between the gap G and the inner diameter Dh of the nozzle hole 62 satisfies the relation (2) described above. On the other hand, the control unit 500 may not drive the moving unit 400 so as to satisfy the relation (2).

(B2) In the three-dimensional shaping apparatus 100 of the first embodiment described above, the control unit 500 drives the moving unit 400 such that the gap G satisfies the above-described relation (3). On the other hand, the control unit 500 may not drive the moving unit 400 so as to satisfy the relation (3).

(B3) In the three-dimensional shaping apparatus 100 of the first embodiment described above, the nozzle 61 is configured such that the outer diameter Dp of the nozzle surface 63 satisfies the above relation (4). On the other hand, the nozzle 61 may not be configured such that the outer diameter Dp of the nozzle surface 63 satisfies the relation (4).

(B4) The three-dimensional shaping apparatus 100 of the first embodiment described above may include a plurality of shaping units 200. For example, the three-dimensional shaping apparatus 100 may include two shaping units 200, and may discharge the shaping material from the nozzle hole 62 of one of the shaping units 200 and discharge a support material for holding the shape of the three-dimensional shaped object OB being shaped from the nozzle hole 62 of the other shaping unit 200. In this case, the control unit 500 changes the relative position between the nozzle surface 63 and the shaping surface 310 of each shaping unit 200 by the moving unit 400. The control unit 500 drives the moving unit 400 such that the relation between the gap G between the nozzle surface 63 and the shaping surface 310, the layer of the shaping material or the layer of the support material and the outer diameter Dp of the nozzle surface 63 satisfies the above-described relation (1) when the shaping material or the support material is discharged from the nozzle hole 62 of each shaping unit 200. The inner diameter Dh of the nozzle hole 62, the outer diameter Dp of the nozzle surface 63, and the gap G may be different for each shaping unit 200.

(B5) In the three-dimensional shaping apparatus 100 of the first embodiment described above, the plasticizing unit 30 includes a flat cylindrical flat screw 40 and a barrel 50 having a flat screw 52 facing surface. On the other hand, the plasticizing unit 30 may include a screw in which a spiral-shaped groove portion is formed on a side surface of a long shaft member, and a barrel having a cylindrical screw facing surface that faces the groove portion. The three-dimensional shaping apparatus 100 may be a fused deposition modeling system (FDM system) instead of using the rotation of the flat screw 40 to plasticize the material.

C. Other Aspects

The present disclosure is not limited to the embodiments described above, and may be implemented by various aspects without departing from the scope of the present disclosure. For example, the present disclosure can be implemented in the following aspects. In order to solve some or all of problems of the present disclosure, or to achieve some or all of effects of the present disclosure, technical characteristics in the above-described embodiments corresponding to technical characteristics in aspects described below can be replaced or combined as appropriate. If the technical characteristics are not described as essential in the present description, they can be deleted as appropriate.

(1) An aspect of the present disclosure provides a three-dimensional shaping apparatus configured to shape a three-dimensional shaped object by stacking layers of a material. The three-dimensional shaping apparatus includes a stage, a discharge unit that has a nozzle surface in which a nozzle hole is formed, a moving unit configured to change a relative position between the stage and the nozzle surface, and a control unit configured to control the moving unit. The control unit is configured to drive the moving unit such that a relation between a gap G between the nozzle surface and the stage or a layer of the material when the material is discharged from the discharge unit and an outer diameter Dp of the nozzle surface satisfies the following relation (1).

$$Dp \leq 20 \times G + 0.20 \text{ [mm]} \tag{1}$$

According to the three-dimensional shaping apparatus according to the aspect, it is possible to prevent the surface of the three-dimensional shaped object from becoming rough due to interference of the nozzle with the three-dimensional shaped object being formed.

(2) In the three-dimensional shaping apparatus of the above aspect, the control unit is configured to drive the moving unit such that a relation between an inner diameter Dh of the nozzle hole and the gap G satisfies the following relation (2).

$$0 < G \leq Dh \tag{2}$$

According to the three-dimensional shaping apparatus according to the aspect, since the material discharged between the stage and the nozzle surface or between the layer of the material and the nozzle surface can be shaped while being squeezed on the nozzle surface, a three-dimensional shaped object having a smooth surface can be shaped.

(3) In the three-dimensional shaping apparatus according to the above aspect, the control unit is configured to drive the moving unit such that the gap G satisfies the following relation (3).

$$0.05 \text{ [mm]} \leq G \leq 0.20 \text{ [mm]} \tag{3}$$

According to the three-dimensional shaping apparatus according to the aspect, a three-dimensional shaped object having a smooth surface can be shaped.

(4) In the three-dimensional shaping apparatus of the above aspect, the discharge unit is configured such that the outer diameter Dp of the nozzle surface satisfies the following relation (4).

$$0.50 \text{ [mm]} \leq Dp \leq 2.20 \text{ [mm]} \quad (4)$$

According to the three-dimensional shaping apparatus according to the aspect, even when the nozzle surface is inclined relative to the stage, the nozzle can be prevented from interfering with the three-dimensional shaped object being shaped.

The present disclosure may be implemented in various forms other than the three-dimensional shaping apparatus. For example, the present disclosure may be implemented in aspects such as a method for controlling a three-dimensional shaping apparatus and a method for shaping a three-dimensional shaped object.

What is claimed is:

1. A three-dimensional shaping apparatus configured to shape a three-dimensional shaped object by stacking a plurality of layers of a material, the three-dimensional shaping apparatus comprising:
   a stage;
   a discharge unit that has a nozzle surface in which a nozzle hole is formed;
   a moving unit configured to change a relative position between the stage and the nozzle surface; and
   a control unit configured to control the moving unit, wherein
   the control unit is configured to drive the moving unit such that a relation between a gap G between the nozzle surface and the stage or a top layer of the plurality of layers of the material when the material is discharged from the discharge unit and an outer diameter Dp of the nozzle surface satisfies a following relation, $Dp \leq 20 \times G + 0.20 \text{ mm}$, the nozzle surface is non-parallel to a top surface of the top layer of the plurality of layers of the material on the stage,
   an inner diameter Dh of the nozzle hole is 0.20 mm,
   a line width of each layer of the plurality of layers is 0.30 mm,
   a relation between the inner diameter Dh of the nozzle hole and the gap G satisfies a following relation, $0 < G \leq Dh$,
   the gap G satisfies a following relation, $0.05 \text{ mm} \leq G \leq 0.20 \text{ mm}$, and
   the outer diameter Dp of the nozzle surface satisfies a following relation, $0.50 \text{ mm} \leq Dp \leq 2.20 \text{ mm}$.

* * * * *